Nov. 5, 1968  F. W. SCHWING  3,409,334
TUBULAR COLUMN FOR CONVEYING CONCRETE OR THE LIKE
Filed April 26, 1966  4 Sheets-Sheet 1

INVENTOR.
FRIEDRICH WILHELM SCHWING
BY
ATTORNEYS

Nov. 5, 1968     F. W. SCHWING     3,409,334
TUBULAR COLUMN FOR CONVEYING CONCRETE OR THE LIKE
Filed April 26, 1966     4 Sheets-Sheet 2

*INVENTOR.*
FRIEDRICH WILHELM SCHWING
BY
ATTORNEYS

Nov. 5, 1968   F. W. SCHWING   3,409,334
TUBULAR COLUMN FOR CONVEYING CONCRETE OR THE LIKE
Filed April 26, 1966   4 Sheets-Sheet 3

INVENTOR.
FRIEDRICH WILHELM SCHWING
ATTORNEYS

United States Patent Office 3,409,334
Patented Nov. 5, 1968

3,409,334
TUBULAR COLUMN FOR CONVEYING CONCRETE OR THE LIKE
Friedrich Wilhelm Schwing, 424 Dorstener Strasse, 468 Wanne-Eickel, Germany
Filed Apr. 26, 1967, Ser. No. 633,775
Claims priority, application Germany, May 3, 1966, Sch 38,926
6 Claims. (Cl. 302—64)

ABSTRACT OF THE DISCLOSURE

A tubular column for the conveyance of material, such as concrete, made up of a stack of pipe frames which can be readily secured together or disengaged from each other, there being a counterbalanced lateral discharge pipe at the top which by means of a slewing joint can be swung in a horizontal plane. The slewing joint may be at the top so that the lateral discharge pipe essentially swings or at the bottom of the colmun so that the entire stack of pipe frame turns about a vertical axis. In one form the tubular column can be tilted to an inclined position. Hoist means is provided by which the lower pipe frame along with those superimposed on it can be raised to enable adding pipe frames one at a time, or, alternatively, removing pipe frames for increasing or decreasing the height of the tubular column or dismantling same.

Background of the invention

It is customary, to pump conveyable materials and/or mixtures through pipelines to points positioned on higher levels. The advantage of this operation has been considerably decreased when short conveying distances were involved because of the expenditure in time and work needed for laying the pipeline and for securing it in place. If for example the concrete was to be delivered to various floors of a building considerable time is consumed with the difficult and dangerous task of fixing and connecting the pipeline along the front. This expense was not related to the pumping process, which often lasted only a few hours. Dismantling of the pipeline had to be repeated in reverse sequence once the job was completed, since in most cases the pipeline was required on another building site. When the path of the pipeline extended across trenches or water courses or other obstacles, it was always necessary to erect ramps or other kind of stays and supports.

Summary

This invention deals with a transportable tubular column, which is movable in relation to its base, and is adjustable to any desired height or length and is capable of remaining in position by virtue of its own stability at certain heights. If in case of greater height it becomes necessary to underprop or support the column, the slewability of the laterally movable tubular column is attained in that the vertical tubular column with its main section is standing firmly while the upper portion of same and the associated structure are construed pivotally by providing one each slewing joint in the tubular column and ancillary construction.

The lateral tubular column serves for reaching any remote point of floor slab surfaces. The usual interruption heretofore experienced of the pumping process and the re-laying of the horizontal pipeline on floors are thus avoided. In the event, that the procuring range of the lateral tubular column is inadequate for lengthy buildings, the travelling properties of the complete tubular column will serve the extension of the working range. A hose fixed to the end of the lateral tubular column enables the distribution of the conveyed material on the surfaces. Likewise the material to be conveyed can also be charged into vertical chutes. If after a few days on the same building the material must be conveyed to the next floor or to another building on a lower slab, the respective tubular sections are either added or removed by means of the hoisting arrangement and the guide section. A superpositioned doubletube device renders it possible to adjust such sections of the tubular column by means of the hoisting arrangements, which may deviate in their heights. In case an inclined position of the tubular column is desired, in lieu of the slewing joints a hose is installed in the tube and the slewing rim at the bottom of the ancillary construction is replaced by an axle, and inclined positions can be effected by mechanical, hydraulic or pneumatic adjusting means. It is to be understood that material other than concrete can be advantageously handled by this device.

Description of the preferred embodiments

Figure 1:
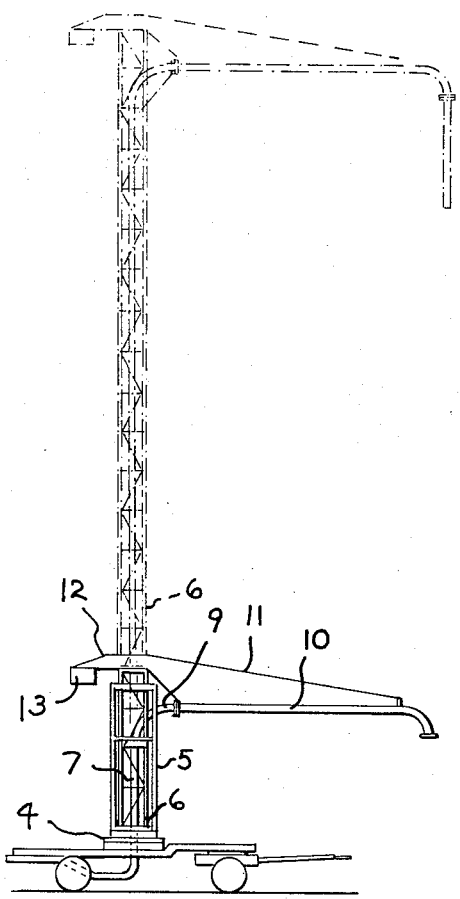
FIGURE 1 is a schematic view in side elevation showing a tubular column with a lateral dispensing section mounted on a trailer chassis, a broken line portion showing how the column may be vertically extended.

Referring to FIG. 1, there is shown a trailer body 1 having supporting wheels 2 and a draft bar 3. Mounted on the platform of the trailer body 1 is a slewing joint 4 which may be of any desired constructions such as a disc fixed to the trailer upon which, a similar disc is rotatable on a vertical axis. If desired, suitable anti-friction bearings may be interposed between these discs. By having the tubular column slewable is meant that the column can turn on the spot where it stands. A fabricated metal base frame 5 is mounted on the slewing joint 4 and is generally rectangular in shape, having vertical rails with horizontal braces. As will hereinafter appear, the brace frame 5 provides the means by which the tubular column can be raised in order to add sections for increasing the vertical height, or, alternatively, for removing sections for decreasing the height. Within the base frame 5 is a portion of the tubular column which consists of a plurality of pipe frames 6 which are secured one to another. The structure of the pipe frames and the manner in which they are connected will hereinafter appear. Suffice it to say at this time, that each pipe frame carries a centrally disposed vertical length of pipe 7.

As shown in FIG. 1 a feed pipe or hose 8 may extend beneath the trailer body 1 to deliver concrete or other material being conveyed to the lowermost pipe section 7. It will be seen that the uppermost pipe frame has a laterally bent pipe section 9 which is suitably secured to a laterally extending dispensing pipe 10 having a downturned end. The weight of the lateral pipe 10 is counterbalanced through tie rods 11, a counter jib 12 with which is associated a ballast or counterweight 13. This enables the pipe 10 along with the stack of pipe frames, to be turned through a radius of 360° about the slewing joint 4.

The broken line arrangement shown in FIG. 1 illustrates how the column can be elevated to the desired height to enable delivery of concrete or other material being handled to the upper floor of a building under construction, for example.

Figure 2:
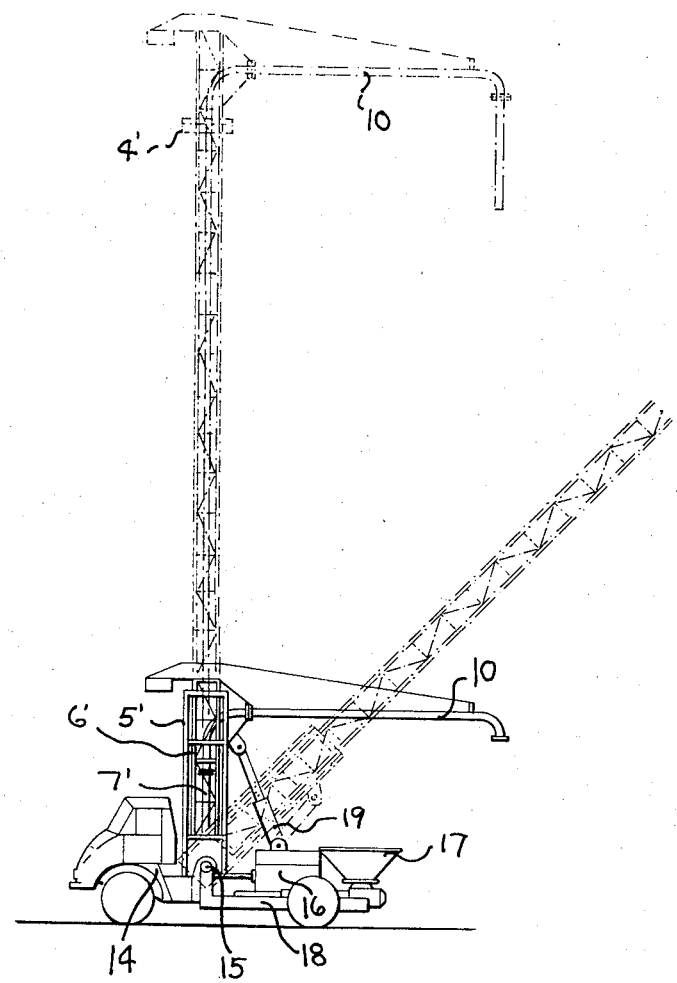
FIGURE 2 is a schematic view in side elevation with the tubular column mounted on a self-propelled vehicle which carries a concrete-handling pump, the slew joint being at the upper portion of the column and the latter being inclinedly adjustable, the broken line positions showing the vertical extensibility and the inclined adjustment of the column.

In FIG. 2 there is shown a self-propelled truck 14 on the bed of which is mounted an upright base frame 5′, similar to the base frame 5 above described. This frame and its associated pipe frame 6′ are mounted on a transverse axle 15 enabling the entire structure to be tilted such as to the broken line position indicated at the right of the figure. A suitably driven concrete pump 16 is mounted on the truck chassis for forcing concrete from a hopper 17 through a pipe 18 to a vertical pipe 7′ carried by the lowermost pipe frame 6′ of the tubular column. Tilting of the column is effected by a piston and cylinder assembly 19 which may be operated in any suitable manner, such as hydraulicly from a pump powered by the truck engine.

In the structure according to FIG. 2 it will be manifest that due to the tilting arrangement of the tubular column, it cannot be turned in accordance with the structure shown on FIG. 1. However, to enable the lateral dispensing pipe 10 to be swung in a horizontal plane, a slewing joint 4′ is provided adjacent the upper part of the top pipe frame. This is shown particularly in the broken line vertical view on FIG. 2. This slewing joint is similar to that above described, and in this case, the tubular column remains fixed and the dispensing pipe 10 has horizontal movement to enable the contents of the tubular column to be delivered to the desired location.

Figure 5:
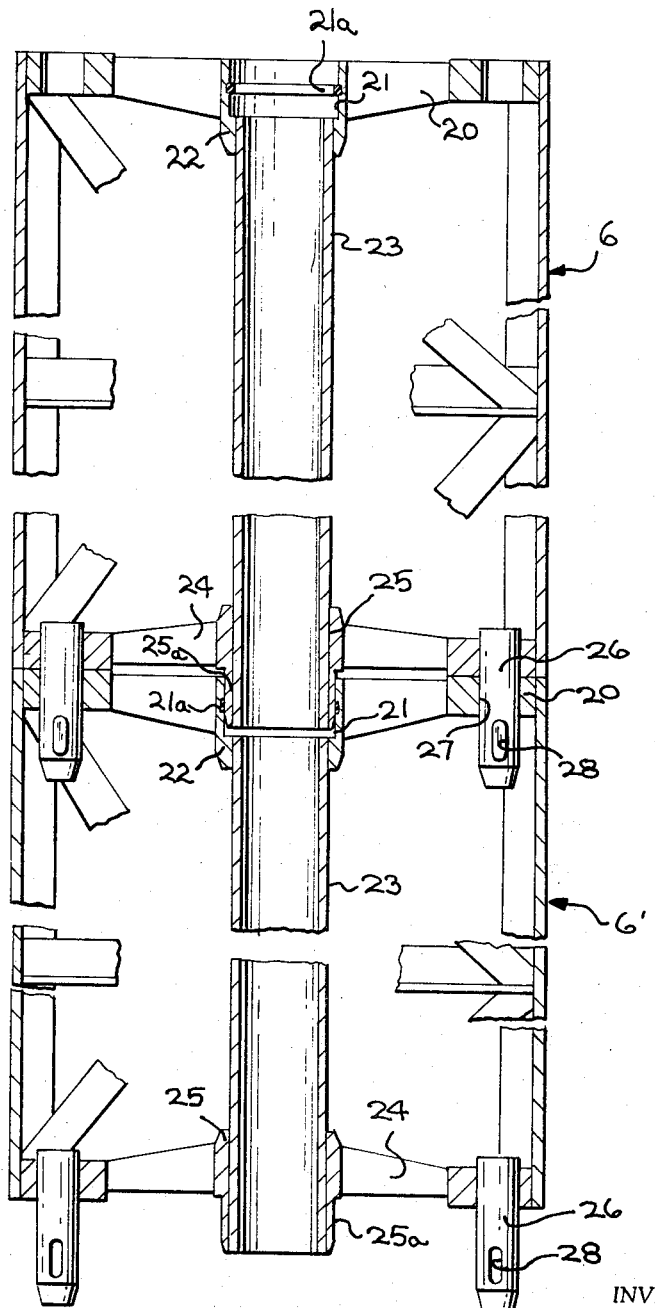
FIGURE 5 is a longitudinal sectional view of two frame parts with central tube portions showing the connecting devices for the frame parts and the tube portions.

With reference to FIG. 5 the manner in which the pipe frames are connected together is shown. In this instance, two pipe frames are shown, an upper one 6 and a lower one 6′. Each pipe frame is rectangular in shape and has vertically disposed angle arms with suitable diagonal bracing. Secured, as by welding, to the upper end of each frame, is a transverse spider 20 which has a central socket member 21. An annular gasket 21a in the socket 21 provides a seal with a sleeve portion of the frame mounted thereupon. A sleeve 22 depends from the lower end of the socket member 21 and receives the adjacent end of a pipe 23 which is fixed in place by welding or in any suitable manner.

At the lower end of each pipe frame is a transverse spider 24 which has a central sleeve 25 to receive the lower end portion of the pipe 23 which is fixedly secured in place. On the lower end of the sleeve 25 is a reduced sleeve portion 25a and this sleeve portion is capable of fitting into the socket 21, where it is sealed in place by the gasket 21a to prevent leakage of the material passing through the tubular column.

In order to secure together adjacent pipe frames, such as 6 and 6′ studs 26 are fixed to the rim of spiders 24 and depend therefrom. Holes 27 formed in the rims of the spiders 20 are positioned to receive the lower end portions of the studs 26 and are of a size to afford a sliding fit. Each of the studs 26 has a vertically elongate hole 28, the upper edge of which is relatively close to the lower face of the spider 20, so that when wedges are driven into the holes 28, the pipe frames 6 and 6′ are securely fastened together with the respective pipes in communication with each other to afford free passage of material, such as concrete, therethrough. The connection is such as to enable the pipe sections to be separated from each other as occasion demands, such, for example, as for decreasing the height of the tubular column, or for dismantling same.

Figure 3:
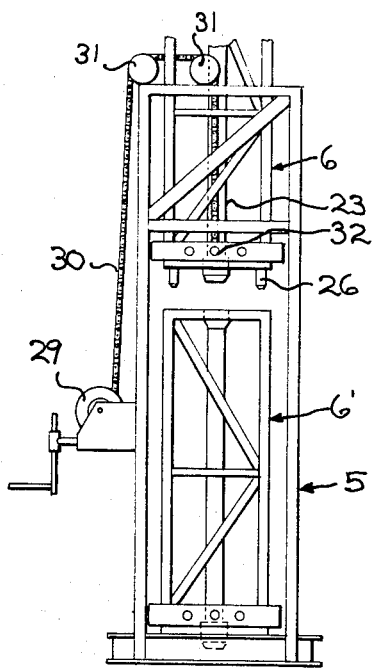
FIGURE 3 is a fragmentary schematic view in side elevation of the column being elevated by a cable and winch, a tubular section being in position beneath the column for engagement therewith.

FIG. 3 shows means by which the height of the tubular column can be increased or decreased. As shown, a hand operated winch 29 is mounted on the base frame 5. A cable 30 from the winch passes over sheaves 31 and thence downwardly to an anchor point 32 on the pipe frame. By manipulating the winch 29, the tubular column can be raised so that a pipe frame 6′ can be set in position beneath the frame 6, as indicated. Thereafter, the upper pipe frame 6 and the column thereupon, can be lowered into place and the adjacent pipe frames secured as above described.

Figure 4:
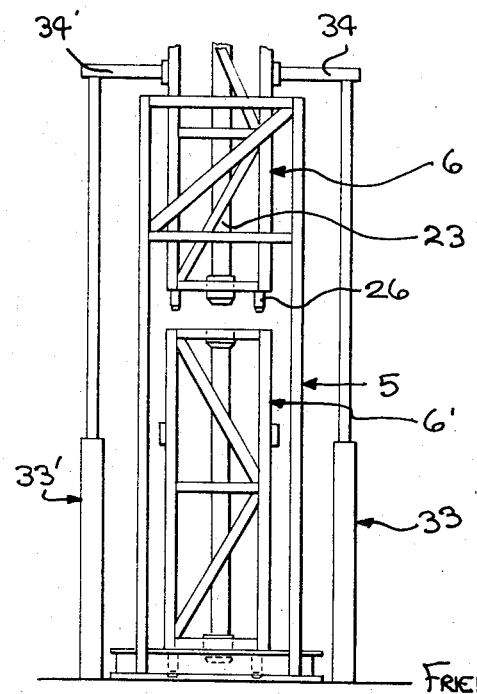
FIGURE 4 is a schematic view similar to FIGURE 3 but showing piston and cylinder assemblies to enable the column to be raised and lowered pneumatically or hydraulicly for effecting vertical extension.

In FIG. 4 there is shown a pneumatic or hydraulic device for accomplishing the same purpose as that of FIG. 3. In this instance, piston and cylinder assemblies 33 and 33′ are arranged on opposite sides of the base frame 5, the upper ends of the pistons being connected to transverse beams 34 and 34′ respectively, which are suitably attached to the sides of the pipe frame 6. Manifestly, by operating these piston and cylinder assemblies, the pipe frame 6 and any pipe frame or frames superimposed thereupon forming the tubular column, can be raised sufficiently to introduce or remove the pipe section 6′, as will be clear from the above description.

What I claim is:

1. A tubular column for conveying concrete or the like, comprising a plurality of stacked separable pipe frames, each having a length of pipe rigidly secured thereto, each length of pipe being axially aligned with adjacent lengths to provide a tubular column, a supporting base for said tubular column, detachable means for securing together adjacent pipe frames, a laterally extending discharge pipe at the uppermost pipe frame, and a slewing joint for enabling said discharge pipe to be swung about an axis coincident with the axis of the tubular column, said slewing joint being interposed between said base and said tubular column so that the entire stack of pipe frames turns with said discharge pipe.

2. The organization as claimed in claim 1, in which said slewing joint is disposed at an intermediate location of said tubular column so that the upper portion thereof is turnable and the lower portion is relatively stationary.

3. The organization as claimed in claim 1, comprising a pivotal mounting for the lower end of said tubular column to enable tilting of the latter about a horizontal axis, and means effecting such tilting movement of the tubular column.

4. The organization as claimed in claim 1, comprising means for counterbalancing said laterally extending discharge pipe.

5. The organization as claimed in claim 1, in which each pipe frame comprises a fabricated structure, a spider fixed to the upper end of said structure provided with a central sleeve, the upper portion of which constitutes a socket, a pipe having its upper end engaging the lower end of said sleeve, the rim of said spider having stud-receiving holes, a second spider fixed to the lower end of said structure having a central sleeve into which the lower end of said pipe fits, said last sleeve having an end portion dimensioned to fit into the socket of the pipe frame therebeneath, and studs depending from the rim of said second spider and fixed thereto and for entry into the holes in the rim of the upper spider in the pipe frame therebeneath and means engaging the end portions of said studs for securing adjacent pipe frames together, said means being removable to enable separation of adjacent frames.

6. The organization as claimed is claim 1, comprising an upright base frame enclosing the lowermost pipe frame and spaced therefrom, and hoist means on said base frame for engagement with an adjacent pipe frame for elevating the latter and superimposed pipe frames to enable the insertion of another pipe frame for increasing the height of the tubular column, or, alternatively, for the removal of a pipe section.

References Cited

UNITED STATES PATENTS

| | | | |
|---|---|---|---|
| 1,582,274 | 4/1926 | Kaltenbach | 212—56 |
| 2,857,994 | 10/1958 | Sheard | 212—64 X |
| 3,030,152 | 4/1962 | Hoshino | 302—64 |

ANDRES H. NIELSEN, *Primary Examiner.*